US012441490B2

United States Patent
Lu et al.

(10) Patent No.: US 12,441,490 B2
(45) Date of Patent: Oct. 14, 2025

(54) Z-SHAPED LAYOUT FIXED LENGTH DOUBLE-ROPE GROUPED CLOSED FORCE SYSTEM CAPTURING AND RECYCLING NET SYSTEM

(71) Applicant: Zhengzhou Machinery Research Institute Co., Ltd, Zhengzhou (CN)

(72) Inventors: Zhihui Lu, Zhengzhou (CN); Guangfei You, Zhengzhou (CN); Kailiang Ou, Zhengzhou (CN); Jiantao Niu, Zhengzhou (CN); Guoliang Zheng, Zhengzhou (CN); Zhiyang Sun, Zhengzhou (CN); Leile Zhang, Zhengzhou (CN); Yiyong Wu, Zhengzhou (CN); Yongqiang Qiao, Zhengzhou (CN); Qianli Ma, Zhengzhou (CN); Chao Li, Zhengzhou (CN)

(73) Assignee: Zhenzhou Machinery Research Institute Co., Ltd, Zhengzhou (CN)

( * ) Notice: Subject to any disclaimer, the term of this patent is extended or adjusted under 35 U.S.C. 154(b) by 107 days.

(21) Appl. No.: 18/591,054

(22) Filed: Feb. 29, 2024

(65) Prior Publication Data
US 2025/0026502 A1     Jan. 23, 2025

Related U.S. Application Data

(63) Continuation of application No. PCT/CN2024/077658, filed on Feb. 20, 2024.

(30) Foreign Application Priority Data

Jul. 19, 2023 (CN) .......................... 202310886506.6

(51) Int. Cl.
*B64G 5/00* (2006.01)

(52) U.S. Cl.
CPC ..................................... *B64G 5/00* (2013.01)

(58) Field of Classification Search
CPC .... B64G 5/00; B64G 2005/005; B64G 1/006; B64G 1/623; B64G 1/625
See application file for complete search history.

(56) References Cited

U.S. PATENT DOCUMENTS 10,093,433 B2 * 10/2018 Knudsen ................... B64G 5/00
10,518,902 B2 * 12/2019 Briggs ..................... B64F 1/029
(Continued)

FOREIGN PATENT DOCUMENTS

CN             114572429 A   *  6/2022  ............... B64G 5/00

*Primary Examiner* — Richard Green
(74) *Attorney, Agent, or Firm* — Hawaii Patent Services; Nathaniel K. Fedde; Kenton N. Fedde

(57) ABSTRACT

Disclosed is a Z-shaped layout fixed-length double-rope grouped closed force system capturing and recycling net system. The system includes a capturing and intercepting assembly which includes a rope group a, a rope group b, a rope group c, and a rope group d that are each wound with two movable wheel groups oppositely arranged, the rope group a between the two movable wheel groups is an intercepting section a, the rope group b between the two movable wheel groups is an intercepting section b, the rope group c between the two movable wheel groups is an intercepting section c, and the rope group d between the two movable wheel groups is an intercepting section d. The disclosure can effectively decrease the lengths of the rope group a1, the rope group b2, the rope group c3 and the rope group d4 and the force and work of traction devices.

4 Claims, 5 Drawing Sheets

(56) References Cited

U.S. PATENT DOCUMENTS 10,800,545 B2 * 10/2020 McDonnell .............. B64G 5/00
10,822,122 B2 * 11/2020 Grose ...................... B64G 5/00

* cited by examiner

Z-SHAPED LAYOUT FIXED LENGTH DOUBLE-ROPE GROUPED CLOSED FORCE SYSTEM CAPTURING AND RECYCLING NET SYSTEM

TECHNICAL FIELD

The disclosure relates to the field of rocket case body capturing and recycling, in particular to a Z-shaped layout fixed-length double-rope grouped closed force system capturing and recycling net system.

BACKGROUND

The rocket case body capturing and recycling technology refers to a technology for recycling and reusing rockets after launching. The launching cost of a disposable carrier rocket is very high. The high launching cost is an important factor for restricting the development of the aerospace industry. The use of the rocket case body recycling technology can reduce the launching cost. The cost of each launching is as high as 60 million dollars. If a rocket case body is successfully recycled, it is possible to reduce the cost to less than 10 million dollars for one launching, and the effect is significant.

A rocket case body recycling method mainly includes a parachute recycling method and a rocket gliding recycling method. The parachute recycling method is to unfold a parachute after a rocket enters the atmosphere, decelerate the rocket by resistance, and then lands the rocket vertically to the ground. This method is suitable for smaller rockets and satellites. The rocket gliding recycling method means that the rocket glides in the atmosphere by means of wings to perform a certain degree of deceleration and control, and then lands the rocket vertically by a propeller. This recycling method is relatively cumbersome in process. Therefore, a Z-shaped layout fixed-length double-rope grouped closed force system recycling net system is provided to solve the above problems.

SUMMARY

An object of the disclosure is to provide a Z-shaped layout fixed-length double-rope grouped closed force system capturing and recycling net system to solve the problems existing in the above prior art and make a recycling method applicable to different rocket case bodies.

In order to achieve the above object, the disclosure provides the following solutions: the disclosure provides a Z-shaped layout fixed-length double-rope grouped closed force system capturing and recycling net system, including:

a capturing and intercepting assembly, where the capturing and intercepting assembly includes a rope group a, a rope group b, a rope group c and a rope group d, the rope group a, the rope group b, the rope group c and the rope group d are each wound with two movable wheel groups oppositely arranged, the rope group a between the movable wheel groups is an intercepting section a, the rope group b between the two movable wheel groups is an intercepting section b, the rope group c between the two movable wheel groups is an intercepting section c, the rope group d between the two movable wheel groups is an intercepting section d, the intercepting section a and the intercepting section b are arranged in parallel, the intercepting section c and the intercepting section d are arranged in parallel, and the intercepting section a and the intercepting section c are arranged perpendicularly; and a supporting assembly, where the supporting assembly includes four stand columns fixedly connected to a base, a guide rail is fixedly connected between the two adjacent stand columns, the movable wheel groups are slidingly connected to the guide rails, traction devices are drivingly connected to the movable wheel groups, a plurality of fixed wheels are arranged on the stand column, the rope group a, the rope group b, the rope group c and the rope group d are each wound around the different fixed wheels, ends of the rope group a, the rope group b, the rope group c and the rope group d are each connected to the four stand columns.

Preferably, the rope group a, the rope group b, the rope group c and the rope group d each include two intercepting cables, and both ends of each intercepting cable are connected to the oppositely arranged stand columns. Each intercepting cable is wound around the movable wheel group, and the two intercepting cables are arranged crosswise.

Preferably, the traction devices are located in the stand columns.

Preferably, the four stand columns are internally provided with a plurality of rope retracting and releasing mechanisms and a plurality of tensioning mechanisms. Both ends of the intercepting cable are fixedly connected to the rope retracting and releasing mechanisms. The tensioning mechanisms are arranged at both ends of the intercepting cable.

The disclosure discloses the following technical effects: in the present device, the intercepting section a, the intercepting section b, the intercepting section c and the intercepting section d form a #-shaped structure to facilitate the interception of a rocket case body. The rope group a, the rope group b, the rope group c and the rope group d are each provided with two movable wheel groups. During interception movement, the intercepting section a, the intercepting section b, the intercepting section c and the intercepting section d are convenient for movement. The two movable wheel groups of each rope group are respectively arranged on the two opposite guide rails, making movement more convenient. The multiple fixed wheels are used to guide the directions of the rope group a, the rope group b, the rope group c and the rope group d, so that the rope group a, the rope group b, the rope group c and the rope group d enter the insides of the stand columns to facilitate the adjustment of the lengths and tension of the rope group a, the rope group b, the rope group c and the rope group d. The disclosure can effectively decrease the lengths of the rope group a1, the rope group b2, the rope group c3 and the rope group d4, and meanwhile, also decrease the force and work of the traction devices.

BRIEF DESCRIPTION OF DRAWINGS

In order to explain the embodiments of the disclosure or the technical solutions in the prior art more clearly, the accompanying drawings needed to be used in the embodiments will be briefly introduced below. Apparently, the accompanying drawings in the following description are only some embodiments of the disclosure. For a person skilled in the art, other accompanying drawings can also be obtained based on these drawings without exerting creative efforts.

REFERENCE NUMERALS

Figure 1:
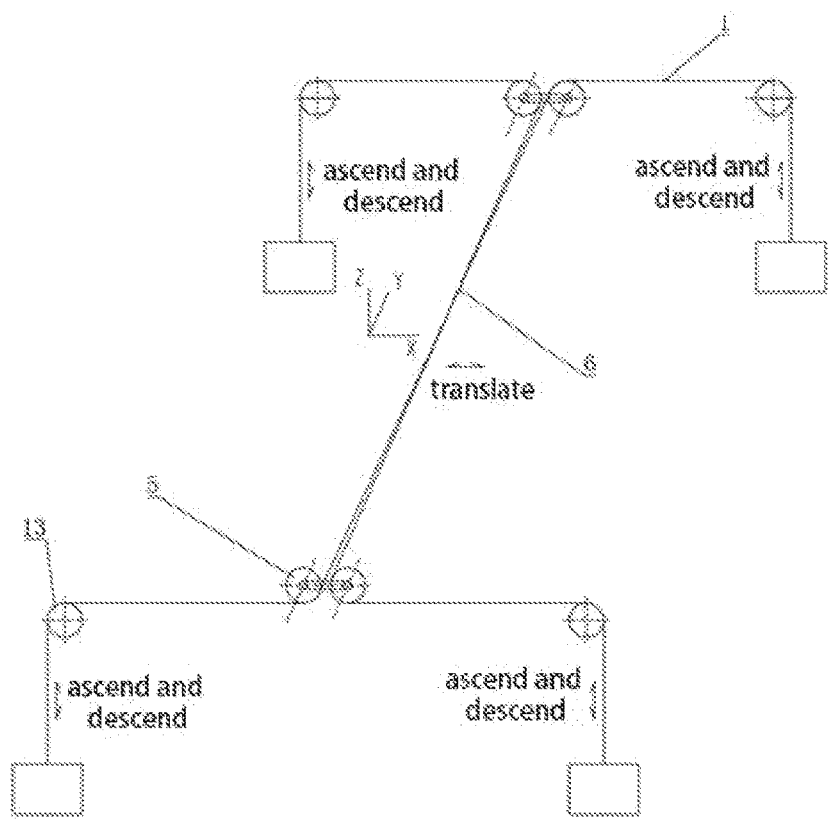
FIG. 1 is a schematic diagram of a Z-shaped layout fixed-length double-rope grouped closed force system capturing and recycling net system of the disclosure.
Figure 2:
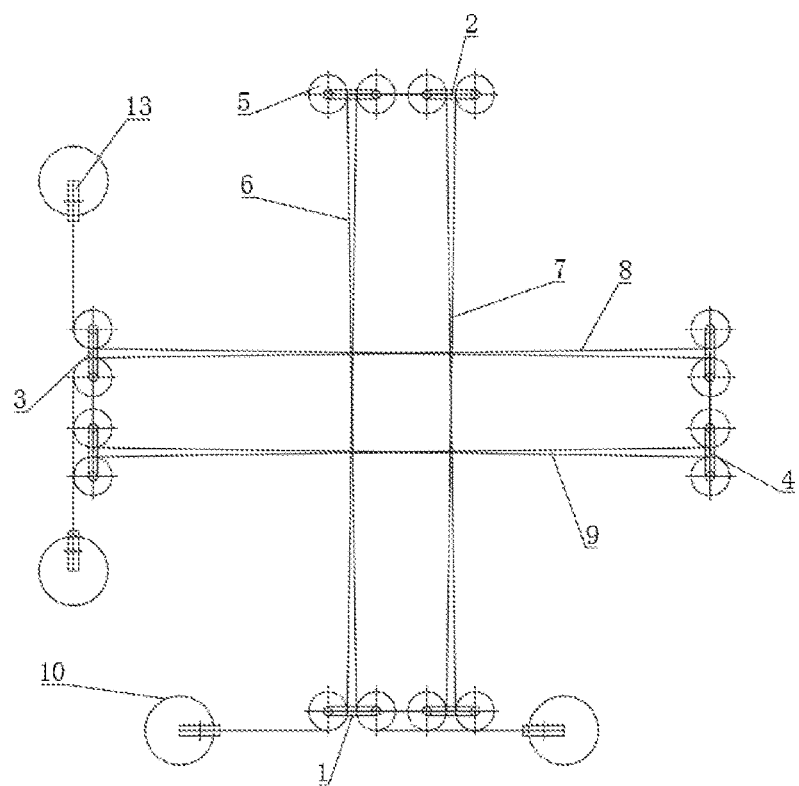
FIG. 2 is a schematic structural diagram of a rope group a of the disclosure.

1. Rope group a; 2. Rope group b; 3. Rope group c; 4. Rope group d; 5. Movable wheel group; 6. Intercepting section a; 7. Intercepting section b; 8. Intercepting section c; 9. Intercepting section d; 10. Stand column; 11. Base; 12. Guide rail; 13. Fixed wheel; 14. Intercepting cable; 15. Traction device; 16. Rope retracting and releasing mechanism; 17. Tensioning mechanism.

DETAILED DESCRIPTION OF EMBODIMENTS

The technical solutions in the embodiments of the disclosure will be clearly and completely described below with reference to the accompanying drawings in the embodiments of the disclosure. Obviously, the described embodiments are only some of the embodiments of the disclosure, rather than all the embodiments. Based on the embodiments of the disclosure, all other embodiments obtained by a person skilled in the art without creative efforts fall within the scope of protection of the disclosure.

In order to make the above objects, features and advantages of the disclosure more obvious and understandable, the disclosure will be described in further detail below with reference to the accompanying drawings and specific embodiments.

Referring to FIGS. 1-9, the disclosure provides a Z-shaped layout fixed-length double-rope grouped closed force system capturing and recycling net system, including:

a capturing and intercepting assembly, where the capturing and intercepting assembly includes a rope group a1, a rope group b2, a rope group c3 and a rope group d4, the rope group a1, the rope group b2, the rope group c3 and the rope group d4 are each wound with two movable wheel groups 5 oppositely arranged, the rope group a1 between the movable wheel groups 5 is an intercepting section a6, the rope group b2 between the two movable wheel groups 5 is an intercepting section b7, the rope group c3 between the two movable wheel groups 5 is an intercepting section c8, the rope group d4 between the two movable wheel groups 5 is an intercepting section d9, the intercepting section a6 and the intercepting section b7 are arranged in parallel, the intercepting section c8 and the intercepting section d9 are arranged in parallel, and the intercepting section a6 and the intercepting section c8 are arranged perpendicularly; and a supporting assembly, where the supporting assembly includes four stand columns 10 fixedly connected to a base 11, a guide rail 12 is fixedly connected between the two adjacent stand columns 10, the movable wheel groups 5 are slidingly connected to the guide rail 12, a traction device 15 is drivingly connected to the movable wheel groups 5, a plurality of fixed wheels 13 are arranged on the stand column 10, the rope group a1, the rope group b2, the rope group c3 and the rope group d4 are each wound around the different fixed wheels 13, and ends of the rope group a1, the rope group b2, the rope group c3 and the rope group d4 are each connected to the four stand columns 10.

The present device is arranged on the base. The four stand columns 10 are used to support the present device. The rope group a1, the rope group b2, the rope group c3 and the rope group d4 are used to intercept a rocket case body. The intercepting section a6 and the intercepting section b7 are arranged in parallel, the intercepting section c8 and the intercepting section d9 are arranged in parallel, and the intercepting section a6 and the intercepting section c8 are arranged perpendicularly, so that the intercepting section a6, the intercepting section b7, the intercepting section c8 and the intercepting section d9 form a #-shaped structure, the rocket case body falls into the middle of the #-shaped structure, and the two movable wheel groups 5 on the rope group a1 are respectively arranged on the two opposite guide rails 12. During the recycling of the rocket case body, it is necessary to continuously adjust the movable wheel groups 5. The traction device 15 can make the movable wheel groups 5 move on the guide rails 12. Each movable wheel group 5 can be provided with two traction devices 15 to facilitate the movement of the movable wheel groups 5. The two movable wheel groups 5 on the rope group b2, the rope group c3 and the rope group d4 are arranged in the same way as the rope group a1. The multiple fixed wheels 13 are used to guide the directions of the rope group a1, the rope group b2, the rope group c3 and the rope group d4, so that the rope group a1, the rope group b2, the rope group c3 and the rope group d4 enter the insides of the stand columns 10 to facilitate the connection of two ends of the rope group a1, the rope group b2, the rope group c3 and the rope group d4 to other devices. When the rocket case body is recycled, there is no need to adjust the length and tension.

To further optimize the solution, the rope group a1, the rope group b2, the rope group c3 and the rope group d4 each include two intercepting cables 14. Both ends of each intercepting cable 14 are connected to the oppositely arranged stand columns 10. Each intercepting cable 14 is wound around the movable wheel group 5, and the two intercepting cables 14 are arranged crosswise.

Figure 3:
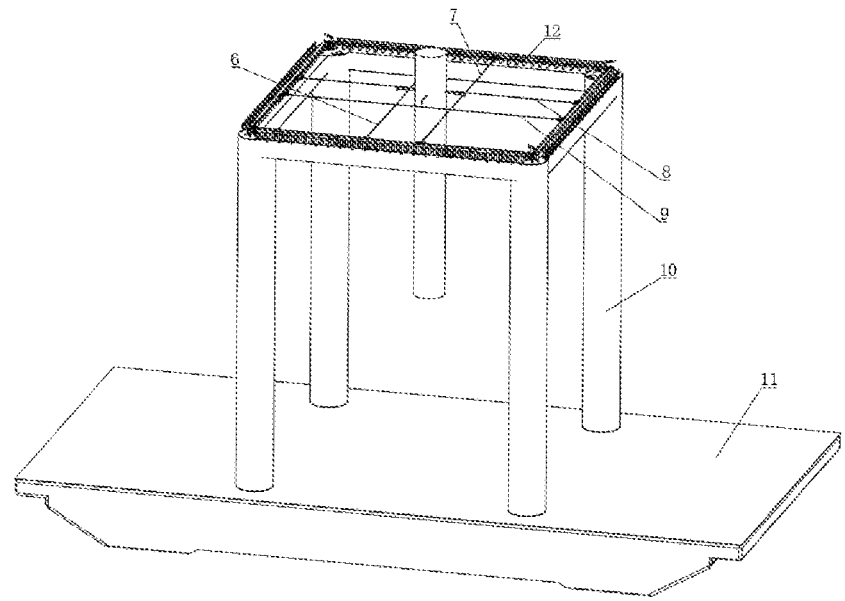
FIG. 3 is a schematic structural diagram of a stand column of the disclosure.
Figure 4:
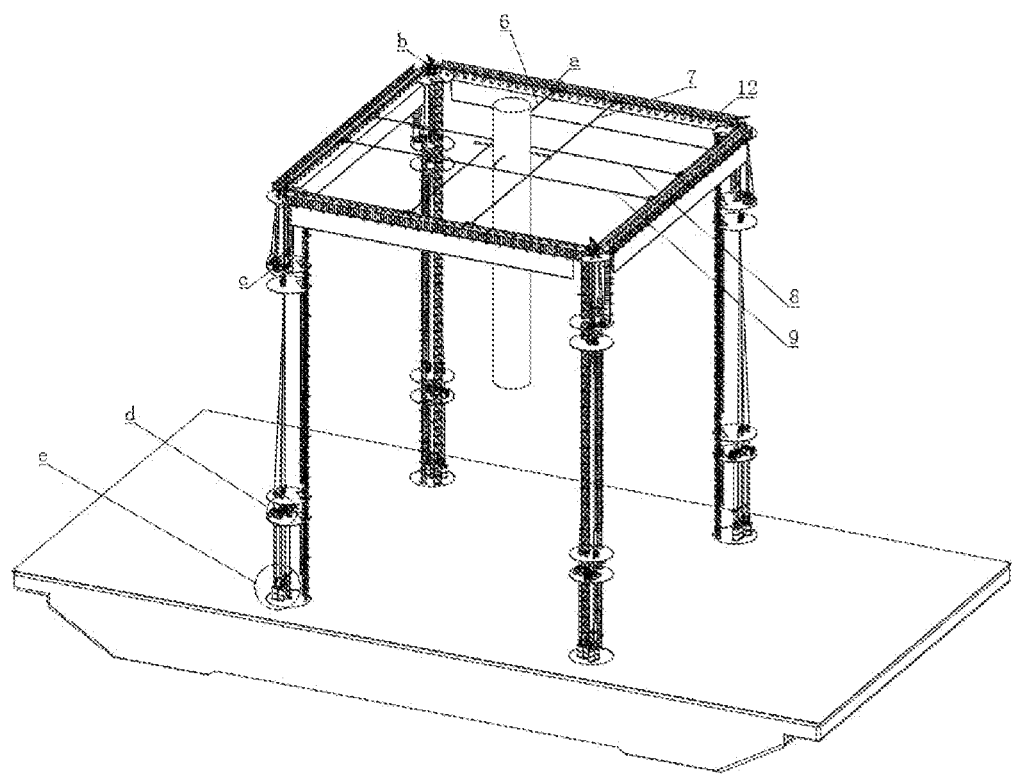
FIG. 4 is a schematic structural diagram of the inside of the stand column of the disclosure.
Figure 5:
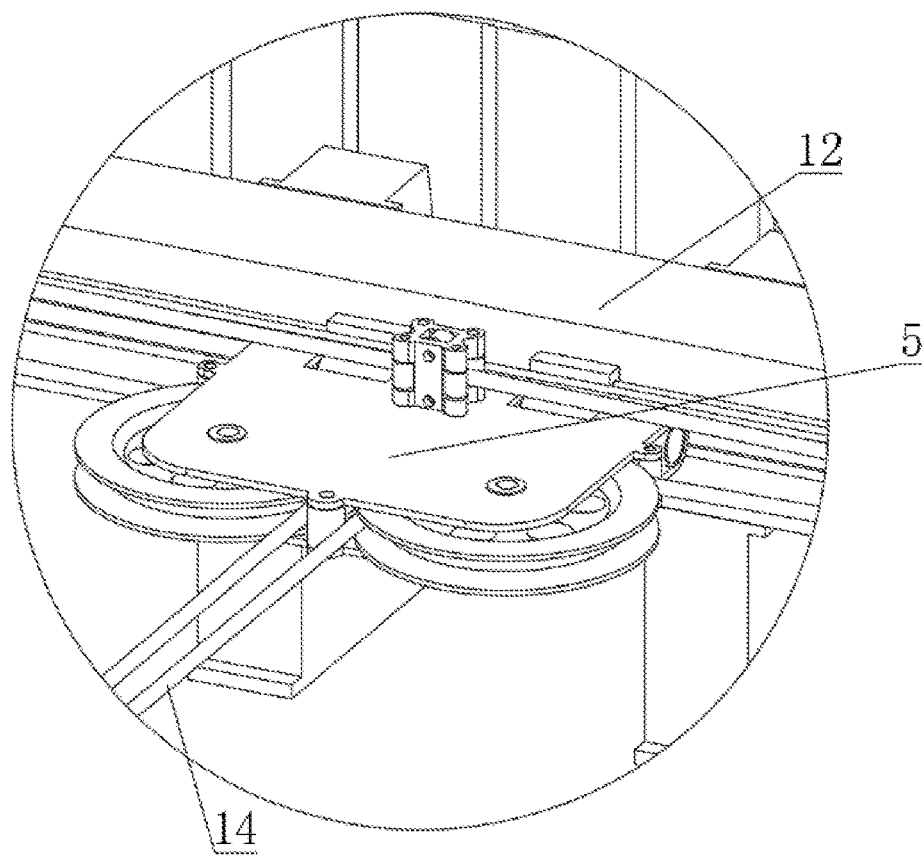
FIG. 5 is a partial enlarged view of a in FIG. 4.
Figure 6:
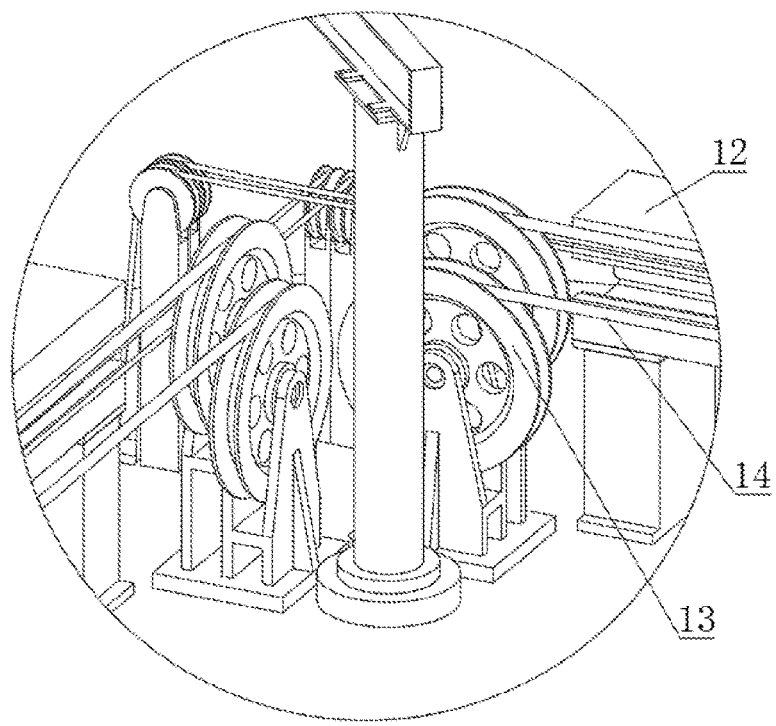
FIG. 6 is a partial enlarged view of b in FIG. 4.
Figure 7:
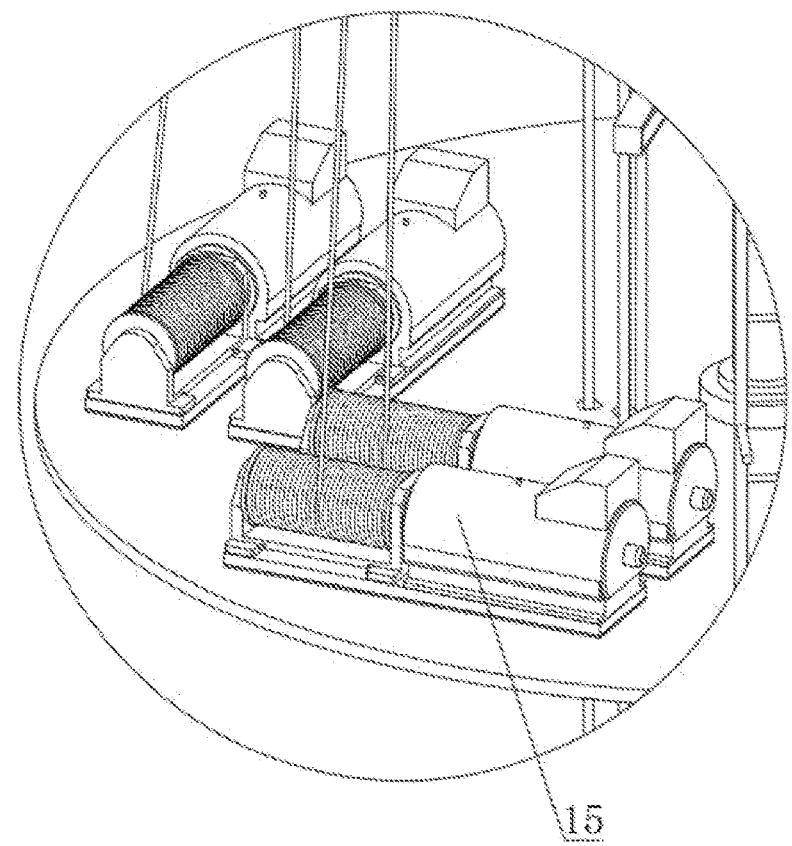
FIG. 7 is a partial enlarged view of c in FIG. 4.
Figure 8:
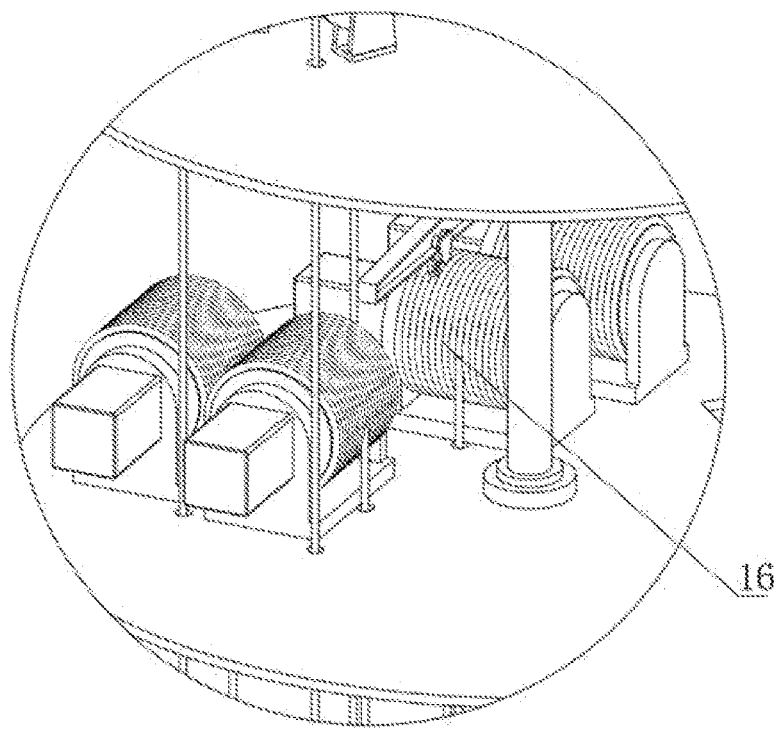
FIG. 8 is a partial enlarged view of d in FIG. 4.
Figure 9:
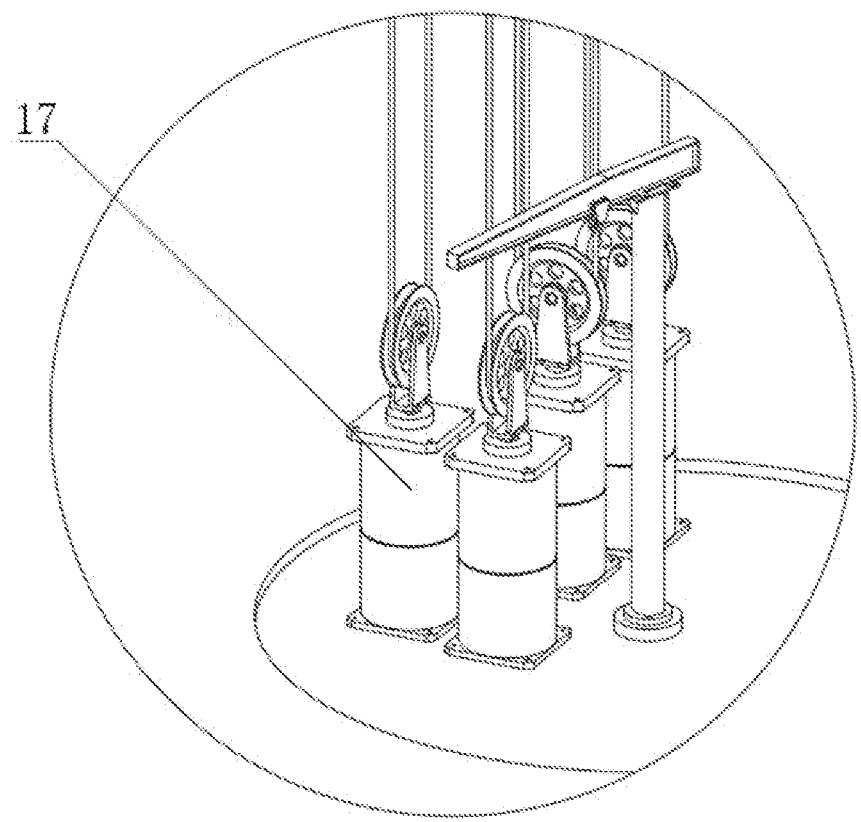
FIG. 9 is a partial enlarged view of e in FIG. 4.

The movable wheel group 5 is composed of two movable wheels fixedly connected together. The two intersecting cables 14 arranged crosswise are respectively wound around the two different movable wheels. Referring to FIG. 1 and FIG. 3, the intercepting cables 14 are led out from the stand columns 10. Guided by the fixed wheel 13, the intercepting cables are wound around one movable wheel in the movable wheel group 5, and are then directed to one movable wheel in the opposite movable wheel group 5. After being wound, the intercepting cables are then directed to the diagonally arranged stand columns 10, and after being guided by the fixed wheel 13, the intercepting cables enter the insides of the stand columns 10. In fact, the intercepting section a6 is two crossed intercepting cables 14. The rope group b2, the rope group c3 and the rope group d4 have the same structure as the rope group a1. Both ends of each intercepting cable 14 are provided with a counterweight mechanism to connect the two movable wheels together to form a movable wheel group 5. After the two intercepting cables 14 respectively pass through the two movable wheels on one movable wheel group 5, the gravity of counterweights on both sides cancels each other out, and more effort will be saved when the traction devices 15 pull the movable wheel groups 5 to move.

To further optimize the solution, the traction devices 15 are located inside the stand columns 10.

The traction devices 15 are used to pull the movable wheel groups 5 to move. In each rope group, there is an intercepting cable 14 on each movable wheel group 5. The intercepting cable 14 on each movable wheel group 5 pulls the movable wheel group 5 to both sides, so that the movable wheel group 5 is in a balanced state. When the traction devices 15 pull the movable wheel groups 5 to move, less force can be used, thereby reducing the power consumption of the equipment. When the rocket case body fall downs, the movable wheel group 5 can be moved quickly, so that the rocket case body can be accurately intercepted.

To further optimize the solution, the four stand columns 10 are internally provided with a plurality of rope retracting and releasing mechanisms 16 and a plurality of tensioning mechanisms 17. Both ends of the intercepting cables 14 are fixedly connected to the rope retracting and releasing mechanisms 16, and the tensioning mechanisms 17 are arranged at both ends of the intercepting cables 14.

The rope retracting and releasing mechanisms 16 are used to adjust the lengths of the intercepting cables 14, and the tensioning mechanisms 17 are used to tighten the intercepting cables 14. During the interception of the rocket case body, no adjustment is required.

The working principle of the present device is that in the present device, the lengths of the intercepting cables 14 are adjusted by the rope retracting and releasing mechanisms 16. The tensioning mechanisms 17 tension the intercepting cables 14. The intercepting section a6, the intercepting section b7, the intercepting section c8 and the intercepting section d9 form a #-shaped structure to intercept the rocket case body. When the rocket case body is about to fall down, the movable wheel group 5 can be moved by the traction devices to move the intercepting section a6, the intercepting section b7, the intercepting section c8 and the intercepting section d9, and adjust the interception position. In each rope group, there is an intercepting cable 14 on each movable wheel group 5. The intercepting cable 14 on each movable wheel group 5 pulls the movable wheel group 5 to both sides, so that the movable wheel group 5 is in a balanced state. When the traction device 15 pulls the movable wheel group 5 to move, less force can be used, thereby reducing the force of the traction devices 15.

The movable group 5 is in a self-balancing state. The self-balancing movable wheel group 5 is composed of two movable wheels and connecting seats thereof. The force of the intercepting cable 14 can be converted into the internal force of the system to form a closed force system to prevent the traction cable on the traction device 15 from being affected by the same tension as the intercepting cable 14. At the same time, the initial tension of the intercepting cable 14 can be prevented from acting on the traction cable system. Since the intercepting cables 14 are in a symmetrical Z-shaped layout, the two intercepting cables 14 in each movable wheel group 5 form an intersection near the midspan position. This intersection will produce a certain friction force. After experiments, it has been verified that the friction force is significantly less than the tension. In this way, the present device forms a set of closed force system recycling systems, which cancels the action force of the tensioning system, decreases the moving mass, decreases the length of the intercepting cable 14, and decreases the traction power to the maximum extent.

The disclosure has the following advantages: in the present device, the intercepting section a, the intercepting section b, the intercepting section c and the intercepting section d form a #-shaped structure to facilitate the interception of the rocket case body. The rope group a, the rope group b, the rope group c and the rope group d are each provided with two movable wheel groups. Each movable wheel group includes two movable wheels, and two ropes of the rope group are respectively wound around one movable wheel. During intercepting movement, the intercepting section a, the intercepting section b, the intercepting section c and the intercepting section d are convenient for movement. The traction force of each rope acting on the movable wheel cancels each other out, so that the external force acting on the movable wheel group is greatly decreased. The two movable wheel groups are respectively placed on the two parallel guide rails and move synchronously. The multiple fixed wheels are used to guide the direction of the rope group a, the rope group b, the rope group c and the rope group d, so that the rope group a, the rope group b, the rope group c and the rope group d enter the inside of the stand column to facilitate the adjustment of the lengths and tension of the rope group a, the rope group b, the rope group c and the rope group d. The two ropes of the rope group a are both in a Z shape. When the two movable wheel groups on the rope group a move in the same direction at the same time, the two ropes only enter the intercepting section a from the movable wheel on one side, move the intercepting section a from the movable wheel out on the other side at the same length. The length of the intercepting section a is unchanged. In the same way, when the two movable wheels on the rope group b, the rope group c and the rope group d move at the same time, the lengths of the intercepting section b, the intercepting section c and the intercepting section d are also unchanged. When moving, the intercepting section a is parallel to the intercepting section b, and the intercepting section c is parallel to the intercepting section d. It is more reliable when intercepting the rocket case body, and during the movement of all intercepting sections, the two ends of the rope and the tensioning mechanisms thereof do not need to move. The disclosure can effectively decrease the lengths of the rope group a1, the rope group b2, the rope group c3 and the rope group d4, and meanwhile, also decrease the force and work of the traction device.

In the description of the disclosure, it should be understood that the terms "longitudinal", "lateral", "upper", "lower", "front", "rear", "left", "right", "vertical", "horizontal", "top", "bottom", "inner", "outer", etc. indicating the orientation or positional relationship are based on the orientations or positional relationships shown in the accompanying drawings, and are only for the convenience of describing the disclosure, rather than indicating or implying that the device or element referred to must have a specific orientation, be constructed and operate in a specific orientation and is therefore not to be construed as a limitation of the disclosure.

The above embodiments only describe preferred modes of the disclosure and do not limit the scope of the disclosure. Without departing from the design spirit of the disclosure, various modifications and improvements made by a person skilled in the art to the technical scheme of the disclosure shall fall within the scope of protection defined in the claims of the disclosure.

What is claimed is:

1. A Z-shaped layout fixed-length double-rope grouped closed force system capturing and recycling net system configured to capture a rocket case body, comprising:
   a capturing and intercepting assembly, wherein the capturing and intercepting assembly comprises a rope group a (1), a rope group b (2), a rope group c (3), and a rope group d (4), the rope group a (1), the rope group b (2), the rope group c (3) and the rope group d (4) are each wound with two movable wheel groups (5) oppositely arranged, the rope group a (1) between the movable wheel groups (5) is an intercepting section a (6), the rope group b (2) between the two movable wheel groups (5) is an intercepting section b (7), the rope group c (3) between the two movable wheel groups (5) is an intercepting section c (8), the rope group d (4) between the two movable wheel groups (5) is an intercepting section d (9), the intercepting section a (6) and the intercepting section b (7) are arranged in parallel, the intercepting section c (8) and the intercepting section d (9) are arranged in parallel, and the intercepting section a (6) and the intercepting section c (8) are arranged perpendicularly; and a supporting assembly, wherein the supporting assembly comprises four stand columns (10) fixedly connected to a base (11), a guide rail (12) is fixedly connected between each two adjacent stand columns (10), the movable wheel groups (5) are slidingly connected to the guide rails (12), traction devices (15) are drivingly connected to the movable wheel groups (5), a plurality of fixed wheels (13) are arranged on the stand column (10), the rope group a (1), the rope group b (2), the rope group c (3) and the rope group d (4) are each wound around the different fixed wheels (13), ends of the rope group a (1), the rope group b (2), the rope group c (3) and the rope group d (4) are each connected to the four stand columns (10).

2. The Z-shaped layout fixed-length double-rope grouped closed force system capturing and recycling net system according to claim 1, wherein the rope group a (1), the rope group b (2), the rope group c (3) and the rope group d (4) each comprise two intercepting cables (14), both ends of each intercepting cable (14) are connected to the oppositely arranged stand columns (10), each intercepting cable (14) is wound around the movable wheel group (5), and the two intercepting cables (14) are arranged crosswise.

3. The Z-shaped layout fixed-length double-rope grouped closed force system capturing and recycling net system according to claim 2, wherein the traction devices (15) are located in the stand columns (10).

4. The Z-shaped layout fixed-length double-rope grouped closed force system capturing and recycling net system according to claim 3, wherein the four stand columns (10) are internally provided with a plurality of rope retracting and releasing mechanisms (16) and a plurality of tensioning mechanisms (17), both ends of the intercepting cables (14) are connected to the rope retracting and releasing mechanisms (16), and the tensioning mechanism (17) are arranged at both ends of the intercepting cables (14).

* * * * *